April 4, 1939.  E. W. N. BOOSEY  2,153,411
DRAINAGE SYSTEM FOR SEPARATING OIL FROM WASTE WATER
Filed Oct. 26, 1936  2 Sheets-Sheet 2
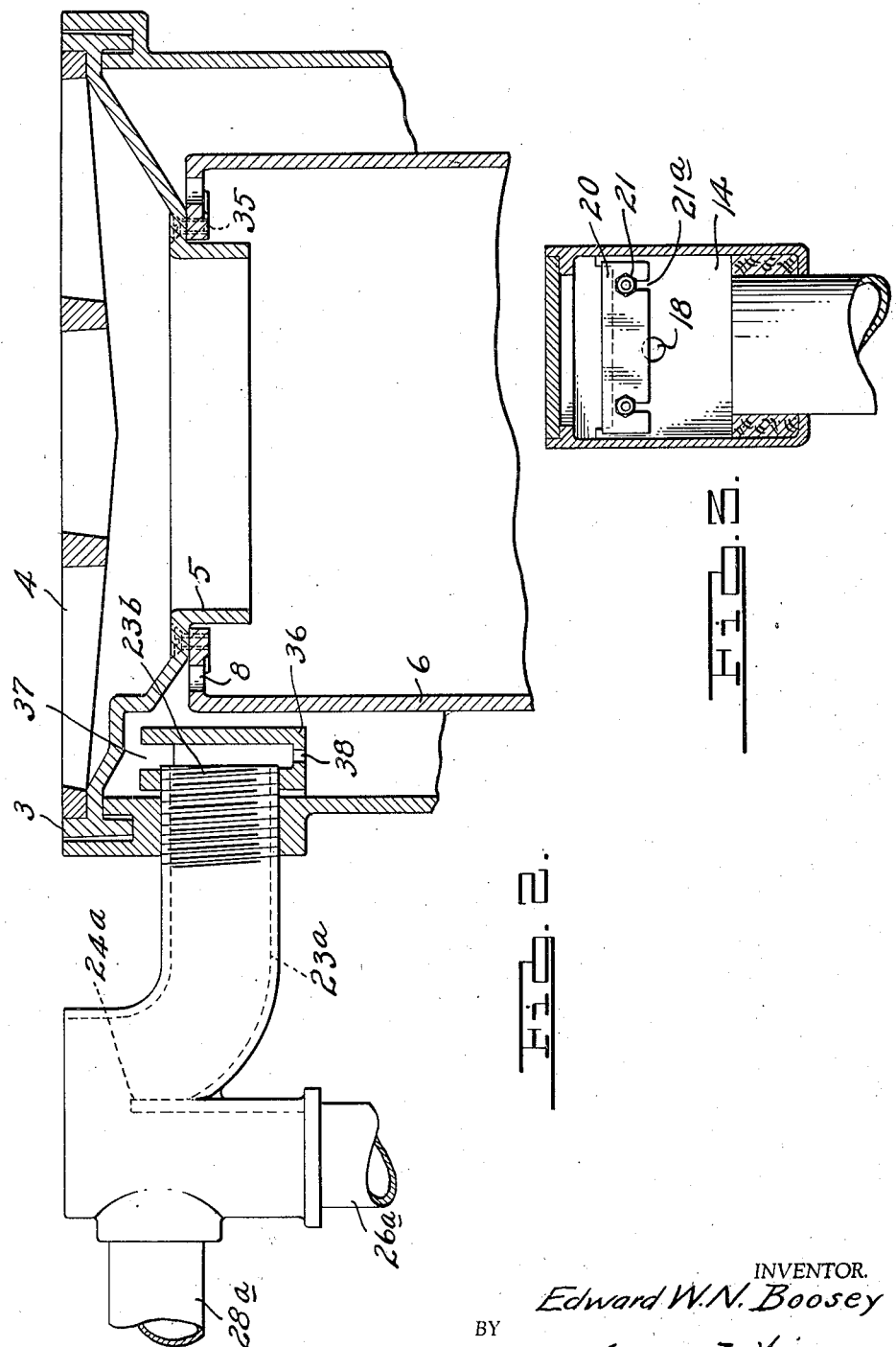
INVENTOR.
Edward W. N. Boosey
BY
ATTORNEY.

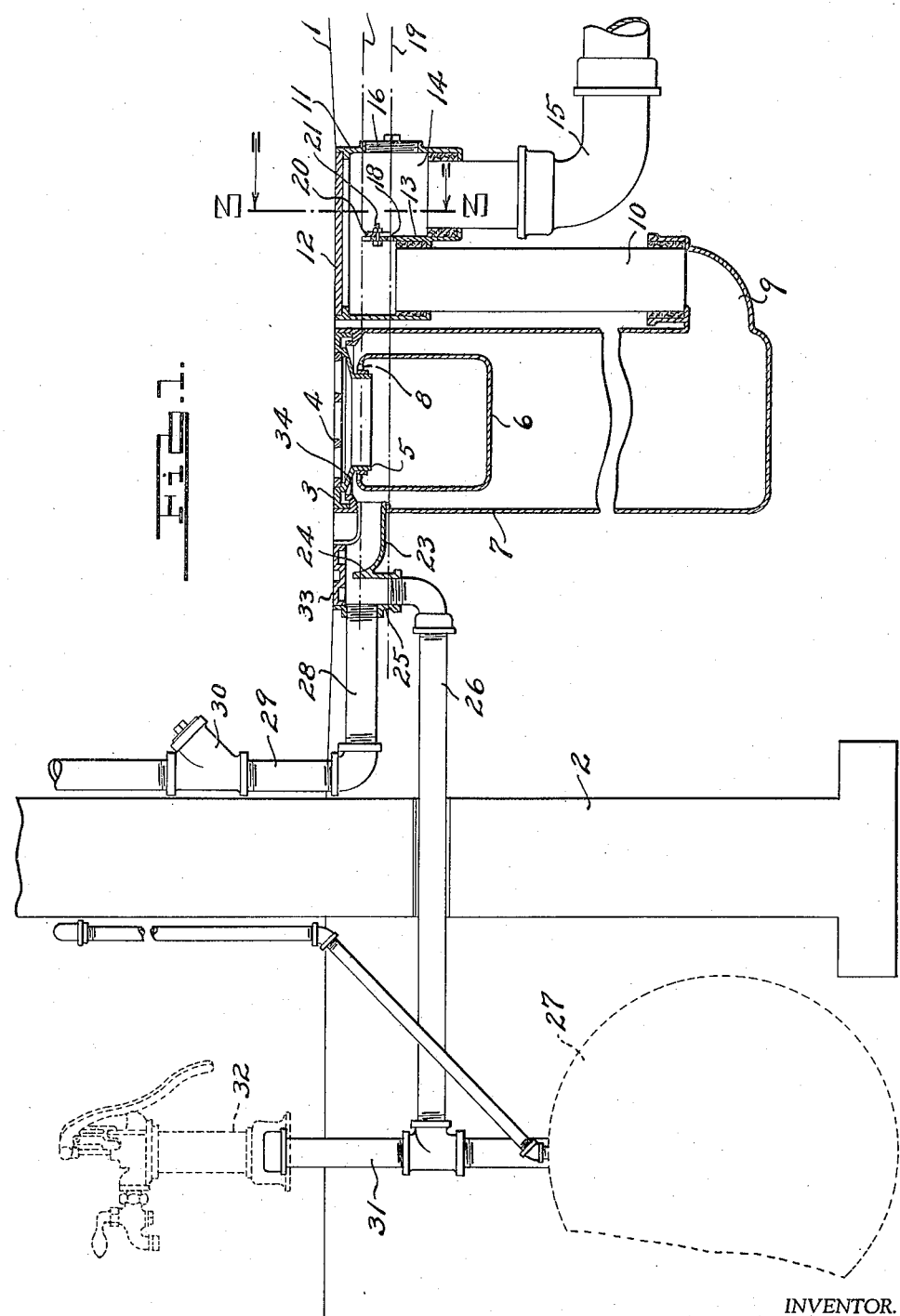

Patented Apr. 4, 1939

2,153,411

UNITED STATES PATENT OFFICE 2,153,411

DRAINAGE SYSTEM FOR SEPARATING OIL FROM WASTE WATER

Edward W. N. Boosey, Detroit, Mich.

Application October 26, 1936, Serial No. 107,546

5 Claims. (Cl. 210—56)

This invention relates to drainage systems of a character providing for a separate discharge of oil and sewage water flowing into a container or sump, the oil being discharged to a storage tank and water free from the oil discharged to the sewer, the parts being so arranged that the oil floating on the surface of the liquid in the container is, at each flushing of the device, raised in level to pass through an oil outlet provided at the top of the container.

A further object and feature of the invention resides in means in conjunction with a drain head whereby the rapidity of flow of mixed water and oil into the container is restricted thereby preventing the carrying of the oil to such depth into the container as to come within influence of flow to the sewage outlet at the bottom of the container and thus discharge to the sewer.

Another object and feature of the invention is to provide, in association with the container into which mixed water and oil are discharged, a vertical discharge conduit wherein the height of the water column under flow conditions may be varied in respect to the oil outlet at the top of the container and the association with the oil outlet of a partition providing a dam permitting oil at the surface of the liquid in the container to pass thereover to the storage tank and preventing water from discharging through the oil outlet and also to provide a vent line for the outlet and the storage tank whereby oil fumes are prevented from passing from the storage tank to the container and through the grating to the room of a building in which it is used.

These and other objects and novel features of the invention are hereinafter more fully described and claimed, and the prefered form of construction of a drainage system embodying my invention is shown in the accompanying drawings in which—

Fig. 1 is a side elevation partly in section showing my improved drainage apparatus.

Fig. 2 is a sectional view of an alternative form of container construction.

Fig. 3 is a sectional elevation taken on line 3—3 of Fig. 1 showing the means provided in the sewage outlet for varying the flow water level.

In the drawings, the floor line of a room is indicated at 1 and its side wall at 2, the floor being sloped each way to the drain head 3. This drain head supports a removable grating 4 of the usual form and has a downwardly extending circular flange 5 centrally below the grating, opening to a receptacle 6 supported thereby in the upper end of the container 7. The receptacle 6 has a series of apertures 8 in its upper end so positioned that the fluid discharging into the receptacle 6 finds egress to the container therethrough. The number of apertures 8 may be varied for reasons hereinafter stated.

The container is here shown as having an outlet 9 at the bottom to which is connected a vertical section 10 opening to a discharge head 11 which also has a cover 12 at the floor line providing access to the upper end thereof. This head 11 has a dividing wall or partition 13 and material flows upwardly through the column 10 and over the top of this partition 13 to the outlet side 14 of the head 11 to which the conduit 15 leading to the sewer is connected. Preferably, there is also a plug 16 providing an opening to the chamber 14. The partition 13 has an aperture 18 therein, the lower edge of which determines the normal water level as indicated by the line 19 shown more clearly in Fig. 3. There is an adjustable plate 20 secured on the partition 13 by means of bolts 21, it having a slot 21a for each bolt which permits the plate 20 to be raised or lowered. The upper edge of the plate 20 determines the flow water level indicated by the line 22 while the aperture 18 determines the normal water level. The plate and aperture 18 are so positioned that the plate may be lowered to cover a greater or less portion of the aperture 18. The purpose of this adjustment is hereinafter more fully described.

The oil outlet 23 opens to the top of the container 7 below the grating and below the level of the outlet apertures 8 of the receptacle 6. This oil outlet is formed with a partition having a dam 24, the upper edge of which is above the flow water line 22 and is also above the uppermost point of the inlet end of the outlet 23. The oil outlet has a depending conduit like portion 25 to which is connected the discharge conduit 26 leading to a storage tank 27.

The portion 25 of the oil outlet is also provided with a threaded opening to receive the horizontal portion 28 of the vent pipe 29. This may be the usual vent of a building for connection of other plumbing fixtures thereto as by means of the fitting 30 shown therein. There is also a vertical pipe 31 extending into the tank and to the upper end of the pipe may be connected a pump indicated at 32 for removal of the oils and gasoline that may accumulate in the tank 27. Waste oils and gasoline usually accumulating on garage floors have a commercial value and may be removed from the storage tank and clarified if desired or used for any other commercial purpose as for instance, a dust arresting product for use on gravel roads.

The oil outlet device is provided with a removable cap 33 at the floor line providing access to the inner end thereof and the inlet end of the pipe 26.

The described arrangement of the parts provides an oil intercepting drainage system that provides for a thorough and efficient separation of the oils from the water flowing into the container through the grating 4. The drain head 3 has a flange fitting in a groove of an internal flange 34 at the top of the container and this joint may be sealed in the well known manner so that gases may not pass through this joint to the room. An accumulation of gases beneath the imperforate head 3 is prevented due to the vent line 23 being connected with the tank adjacent the top of the tank just beneath the flange 34. Thus gases will find an outlet to the vent and will not accumulate in the top of the container with sufficient pressure to cause the same to pass downwardly through the openings 8 in the receptacle 6 and thence through the grating 4.

My improved drainage system functions as follows:

Assuming that there is a normal water level in the container at 19, any oil floating on the top of the water would possibly lay in the lower part of the inlet end of the oil outlet 23. With water and oil being flushed into the container through the grating 4, the water level is immediately raised and oil on the surface of the water in the container 7 will be raised in level to above the floor line 22 and thus oil will be forced to pass out through the outlet 23 while the water is flowing through the vertical conduit 10 and over the adjustable plate or dam 20 to the sewer conduit 15. Due to the difference in specific gravity, this vertical column of water in the conduit 10 will support oil at above the flow level 22 and as it has an outlet below the said line 22 it will be forced over the dam 24 and to the storage tank through the line 26.

It is pointed out that the material flowing into the container through the grating passes through the receptacle 6 wherein sediment is collected and the oil and water are passed through the apertures 8 and fall into the liquid in the container 7 with little force and thus the oils will not be forced down toward the bottom of the container or to anywhere in position to be under influence of flow through the outlet 9.

The aperture 18 at the normal water level 19 is not of sufficient area to permit a rapid discharge of water from the container and thus the adjustable plate or dam 20, when the mixed water and oil is discharged in quantity into the container, raises the water level in the outlet conduit 10 and raises the level of the fluid in the container 7 causing the oils to flow off through the conduit 23 and over the dam 24 to the storage tank through the line 26. The number of holes 8 in the receptacle depend largely on how rapidly fluid may normally discharge into the receptacle 6 and thus in some installations there will be a greater number of holes 8 required than in others in order to provide flow out of the receptacle 6 equal or very nearly equal to the usual flow through the grating at the flushing periods.

The plate 20 is adjusted to higher or lower position, depending upon the volume of liquid that may be flushed into the device under normal conditions of use. That is, with a greater volume being successively discharged into the device in successive periods, the plate 20 is set lower and for less volumes it is usually set a little higher and thus one size of container and accessory parts may be adjusted through variation of the holes 8 and the position of the dam 20 for greater or less volumes of liquid, the purpose being to restrict the flow from the receptacle 6 to prevent too great rapidity of discharge into the container but not to so greatly restrict the flow that liquid will accumulate materially on the floor surface at any flushing thereof. The dam 20 is adjustable to a point permitting a free flow thereover of the volume of liquid that would normally be discharged into the container.

The aperture 18 is covered to a greater or less degree through the adjustment of the vertical position of the plate and should never be sufficiently large to permit a very material volume of liquid to flow therethrough. Thus, each time mixed oil and liquid are flushed into the device, the level will be raised in the container due to the height of the vertical column of liquid in the portion 10 of the waste conduit and the aperture 18 merely permits the level to fall to a normal water level after each flushing period.

There is an alternative form of oil outlet shown in section in Fig. 2. The drain head 3, grating 4, receptacle 6 and container 7 are of the same construction as previously described except that the receptacle 6 may be secured, as by the screw bolts 35, to the flange 5 of the head and has the same outlet apertures 8 at the upper end as in the structure shown in Fig. 1. However, the oil outlet 23a is threaded into a side of the container after the manner shown in Fig. 1 but with the inner end 23b projecting into the container and threaded to receive a fitting 36 which has an opening 37 at its uppermost point just beneath the inwardly extending portion of the head 3, which opening is above the openings 8 of the receptacle 6. This arrangement provides for a free outlet of gases rising to the top of the container 7 through which the said gases flow due to the device being connected with a vent through the conduit 28a corresponding to the conduit 28 in Fig. 1.

There is a small drainage aperture 38 in the bottom edge of the fitting 36 which will permit any material in the oil outlet conduit to flow back into the container after each flushing of the device. The inner end of the fitting 36 presents an imperforate surface to the material flowing out of the receptacle 6 through the apertures 8 and is constructed to require the level of liquid to be raised to flow into the outlet 23a through the aperture 37. This oil outlet device is similar in all other respects to that shown in Fig. 1 and is formed to receive the end of a conduit 26a leading to a storage tank and having the dam indicated by dotted lines 24a.

The structure of Fig. 2 functions in the same manner as that described in relation to the structure shown in Fig. 1, the container 7 being connected with the outlet at its bottom corresponding to the outlet 9 and vertical portion 10 thereof as shown in Fig. 1.

From the foregoing description, it is believed evident that my improved oil intercepting drainage system as shown is of comparatively simple construction; is efficient in operation, separating the oil from the liquid and discharging the same to a storage tank automatically and also discharging the water separately to the sewer line; and that the various objects and features are attained by the construction described, it being understood that various changes may be made in the described specific construction and relationship of the parts without departing from the spirit and scope of the invention as set forth in the appended claims.

Having thus fully described my invention, its utility and mode of operation, what I claim and desire to secure by Letters Patent of the United States is—

1. A drainage system comprising a container, a head extending into the container at the top and having a central discharge opening, a grating carried by the head, a receptacle supported on the said head having a closed bottom and side walls into which liquid flows from the discharge opening of the head, the walls at the upper end of the receptacle having apertures through which liquid flowing into the receptacle overflows therefrom to the container, a sewage outlet at the bottom of the container having a vertical portion for determining the level of liquid in the container, an oil outlet opening to the top of the container below the said head, said outlet being constructed to provide a dam, a vertical plate at the upper end of said vertical portion of the sewage outlet having an aperture for discharge of material and determining the normal water level at a point below the oil outlet and further having a vertically adjustable portion providing a dam determining the flow water level in a plane below the plane of the dam in the oil outlet, and providing a structure in which, as mixed water and oil are discharged into the container through the grating, the increased level of liquid in the container causes oil accumulated on the surface to flow over the dam in the oil outlet, a storage tank to which the oil may flow from the said outlet, and a vent means connected with the outlet and venting the tank and container.

2. In a drainage system, a container having an open upper end, a head including a grating covering said open end, a sewage outlet at the bottom, said outlet having a vertical section terminating in a chamber having a closable opening at approximately the same level as the grating, said head having its peripheral edge supported in the top of the container and extending downwardly and inwardly therefrom shaped to provide a central opening below the grating, an oil outlet opening to the top of the container and having a wall therein providing a dam extending to above its inlet end, a discharge conduit connected with the said oil outlet, a receptacle supported by the head and into which material may pass through the opening therein, said receptacle having openings at its top providing that liquid flowing into the receptacle discharges downwardly into the receptacle and thence passes through the opening as the level of the liquid in the receptacle reaches the same, means in the chamber of the said sewage outlet for determining the normal water level line at a point not materially higher than the lowermost point of the oil outlet, and an adjustable dam in the said sewage outlet chamber for determining the flow water level of the container at a point below the uppermost point of the dam of the oil outlet.

3. In a drainage system for separating oil from waste water, a container having a head provided with a grating at the top through which sewage water containing oils and the like may discharge, the head having a depending flange defining an aperture through which the mixed material flows, a sewage outlet at the bottom of the container, an oil outlet opening at the top of the container below the head, the oil outlet having a wall providing a dam and the sewage outlet having a vertical portion and arranged to discharge to a sewer, a dam between the upper part of the said vertical portion and the point of discharge to the sewer, said dam having an opening therein defining the normal water level in the container, an adjustable plate thereabove for determining the flow water line, the dam of the oil outlet terminating above the flow water line, the structure providing a means wherein the column of water in the vertical portion of the sewage outlet will support oil accumulating on the top of the water in the container at a level to discharge over the said dam in the oil outlet, and an oil conduit opening to the said oil outlet on the discharge side of the dam.

4. In a drainage system for separating oil from waste water, a container, a head comprising a plate peripherally supported at the top of the container, a grating supported by the said head, the plate extending downwardly and inwardly beneath the grating terminating in a central outlet, a receptacle supported by the head to receive mixed oil and sewage water discharging thereinto, the receptacle having a series of apertures at the top to thereby cause fluid to discharge from the receptacle into the container in a series of small streams to thereby prevent forcible discharge into the body of material in the container, a sewage water outlet constructed to provide a vertical column determining the normal water level line below the discharge apertures of the receptacle, means providing for a flow water level at about the top of the receptacle, and an oil outlet connected with the top of the container and having a partition therein forming a dam, the upper edge of which is slightly higher than the flow water level thereby providing a construction in which the column of waste water in the outlet therefor will support oils and greases at a point sufficiently high to pass over the dam in the oil outlet, said dam acting as a skimmer and preventing waste water from passing to the oil outlet.

5. In a drainage system, a container into which sewage containing oil and water may discharge, a sewage outlet having a vertical portion providing a water column determining the normal water level in the container, and means at the sewage outlet comprising an adjustable dam for variably determining the flow water level, there being an opening below the top of the dam providing for flow from the container to the outlet and determining the minimum water level.

EDWARD W. N. BOOSEY.